3,293,232
STABLE OLEFIN CATALYST SYSTEMS
Arthur K. Ingberman, Bridgewater, N.J., assignor to Union Carbide Corporation, a corporation of New York
No Drawing. Original application Aug. 21, 1961, Ser. No. 132,578, now Patent No. 3,179,604, dated Apr. 20, 1965. Divided and this application Mar. 2, 1964, Ser. No. 348,754
8 Claims. (Cl. 260—93.7)

This application is a division of Serial No. 132,578 filed August 21, 1961, now U.S. Patent 3,179,604.

This invention relates to organo-metallic olefin catalyst systems characterized by exceptional retention of catalytic properties and method for preparing such catalysts. The invention further relates to the production of polymers of olefinically unsaturated hydrocarbons by the low pressure process employing novel, highly stable organo-metallic olefin catalysts systems.

K. Ziegler has described the preparation of high molecular weight polymers of olefinically unsaturated hydrocarbons by contacting the monomer with a mixture of an organo-aluminum compound and a compound of a metal of groups IV$b$, V$b$ or VI$b$ of the periodic table.

These catalysts have heretofore been produced by the reaction in an inert solvent medium of the organo-aluminum compound and the metal halide to form an insoluble complex as a precipitate, which is the catalyst. This precipitate is ordinarily in a finely divided condition.

These finely divided catalysts are characteristically sensitive to atmospheric contamination. In addition they appear to be inherently unstable. A typical catalyst is a hydrocarbon insoluble complex of titanium tetrachloride and triisobutyl aluminum prepared in an heptane medium. The rapid decline in catalytic activity of this typical Ziegler catalyst has been documented recently by A. Orzechowski, J. Polymer Sci. 34, 74–5 (1959). The data appearing in Table I following on yield of polyethylene after periods of aging in an inert atmosphere is taken from the Orzechowski article. The gram polymer/gram catalyst data are calculated from the Orzechowski data. Aging in each instance is the elapsed time between the placing of the catalyst in the polymerization vessel and introduction of ethylene into the vessel.

TABLE I

| Catalyst age (min.) | Yield of polyethylene (g.) | Gram polymer/gram catalyst |
|---|---|---|
| 0 | 10.5 | 240 |
| 1–2 | 6.5 | 148 |
| 15 | 1.9 | 43.3 |
| 30 | 0.2 | 4.5 |
| 30 | 0.1 | 2.3 |

It can be seen from Table I that after only 1 to 2 minutes 40% of the original catalyst activity had been lost, after 15 minutes 84% had been lost and after 30 minutes 98 to 99% had been lost. These data reflect the inherent instability of conventionally prepared transition metal halide alkyl aluminum catalyst complexes in even inert atmospheres.

As a result of this poor stability these catalysts have heretofore had to be freshly prepared for each polymerization which of course is inconvenient and costly. Consequences of using partially inactivated catalyst include low yields of polymer and undesirably high concentrations of catalyst residue in the polymer obtained.

It is an object, therefore, of the present invention to provide transition metal halide-alkyl aluminum catalyst systems which are substantially unaffected in catalytic activity by aging for extended periods, even at elevated temperatures.

It is another object to provide method for the preparation of transition metal halide-alkyl aluminum catalyst systems which are substantially unaffected in catalytic activity by aging for extended periods and at elevated temperatures.

It is a further object to provide a process for the production of polymers of olefinically unsaturated hydrocarbons wherein high polymerization rates and minimal catalyst residues are achieved.

It is still another object to achieve finely divided organo-metallic catalysts without grinding.

It has now been discovered that finely divided organo-metallic catalysts exhibiting high initial activity and resistance to deterioration by aging are prepared by reacting together, under continual high speed agitation providing heat producing fluid shear, a fluid transition metal halide and a fluid organo-aluminum compound to produce an inert liquid hydrocarbon insoluble precipitate.

The organo-metallic polymerization catalysts produced by the method of this invention are super-finely divided precipitates consisting of highly geometrically uniform, essentially spheroidal particles. Precipitates obtained under the hereinafter set forth preferred conditions of shear producing agitation have an average particle size diameter between 200 and 300 Angstroms with no appreciable number of particles greater than 500 Angstroms in diameter. The geometry of the particles produced herein is unlike crushed or ground organo-metallic complex precipitates heretofore known which are sharp edged and irregular. The particles I obtained are rounded and essentially uniform and are, therefore, not prone to agglomeration. These particles have not been obtained heretofore by any method.

A Ziegler catalyst precipitate prepared in the manner of this invention surprisingly retains catalytic properties for many days, weeks or months rather than for only a few minutes as with the same catalysts only conventionally prepared. Mere stirring type agitation or no agitation at all, such as presently practiced in the art, provides Ziegler catalysts inferior in activity, both initially and after aging, to those of this invention. For example, the catalytic life of a typical Ziegler catalyst, a reaction product of titanium tetrachloride and triisobutyl aluminum is greatly multiplied by use of the method of this invention. As shown in Table I above, after only 30 minutes of aging at 50° C. the catalyst was reduced one hundred-fold in productivity from 240 to 2.3 grams polymer/gram catalyst. In contrast to this, a catalyst prepared from these reactants under the shear agitation of this invention had a productivity after 20 days of room temperature aging (⅔ of a month at 25° C.) and then being heated at 125° C. in an inert atmosphere for 30 minutes of over 300 grams of polymer per gram catalyst. In comparison, a catalyst prepared from these components by Orzechowski had a maximum productivity of only 240 grams of polymer per gram of catalyst without any aging and this productivity declined a hundred-fold in 30 minutes.

The agitation during reaction necessary to the practice of the method of this invention can be achieved with numerous combinations of vessels and agitating means known to the art. High speed impellers and rotating vented cones are preferred types of agitating means. Any apparatus capable of producing fluid shear sufficient to give a heat output of at least 10 calories per minute per liter of agitated fluid in the reaction system is suitable. Preferred apparatus will accomplish the requisite calorie output more rapidly by providing a higher speed fluid shear in the system. This agitation is basically simply a fluid shear. Shear is present in all agitated vessels to some degree, for example in stirred reactors although the reaction mass rotates with the agitating means, some shearing occurs at the interface of the vessel wall and the moving reaction mass. This is not a fluid shear. To obtain fluid shear it is essential to provide an agitation pattern in a fluid mass such that portions of the mass are in frictional, sliding contact with other portions of the mass. "Fluid shear" as used herein refers to this internal sliding frictional contact between like liquid masses as distinguished from external sliding frictional contact between unlike masses i.e. vessel walls and reaction mass. The inevitable incident of shear is friction and this means production of heat. A convenient index of the quality of shear or the degree of friction being obtained is the amount of heat produced. It is to be emphasized that the preparation of the catalyst and the practice of the method of this invention is no wise dependent upon some critical temperature being achieved in the reaction vessel. Rather the heat differential induced by shear agitation in the reaction vessel between the start of the reaction and the end of reaction is what is important in this invention. It has been found that the desirable catalyst products described above are produced when the agitation in the reaction vessel is sufficient to give an output of 10 calories per minute per liter of agitated fluid. Calorie output is easily determined by multiplying the heat rise obtained in the particular agitated fluid, e.g. the reaction solvent times the volume and times the specific heat thereof. Since the reaction to form the catalyst is exothermic, it is best to ascertain prior to carrying out catalyst preparation whether a particular vessel and agitating system will produce sufficient shear, e.g. by agitating the proposed reaction solvent only. Then having established that minimum shear at least is obtained in a particular vessel catalyst preparation can be carried out without constant measurement of shear development.

Alternatively quality and quantity of shear can be compared with a bench mark of a 5° C. rise at steady state over ambient temperature obtained when agitating 500 milliliters of heptane in an insulated vessel under substantially adiabetic conditions.

As pointed out in the paragraph next above, fluid shear is essential to the practice of the present method. Therefore the reactants, the transition metal halide and the organo-aluminum compound, must both be in the fluid state. Thus their reaction can be effected where the reactants are gaseous fluids or liquid fluids. Liquid fluidity is preferred for convenience in handling the reactants and the product. Liquid fluidity is achieved by using normally liquid reactants (i.e. at room temperature) or by dissolving normally solid reactants in a suitable inert organic solvent or mixture of solvents such as are well known in the art. The two reactants can be dissolved in the same or different solvents. One reactant can be placed in the reaction vessel as a solution and the other can be in the undissolved but liquid state.

It is preferred to dissolve the reactants whether they be liquids or not in an inert organic liquid selected from the class of aromatic and saturated aliphatic hydrocarbons and halogenated aromatic hydrocarbons which are solvents for the reactants but which do not dissolve the reaction product. Specific classes of such solvents include saturated aliphatic and alicyclic hydrocarbons such as alkanes and cycloalkanes e.g. heptane and cyclohexane, aromatically unsaturated hydrocarbons, such as benzene, alkyl substituted aromatically unsaturated hydrocarbons such as toluene, and halogen substituted aromatically unsaturated hydrocarbons, such as dichlorobenzene.

As the transition metal halide there can be used in this invention compounds having the formula $$MO_aX_b$$

wherein M is a transition metal selected from groups IVb, Vb or VIb of the Deming periodic table (Handbook of Chemistry and Physics, 30th ed., page 312) for example, Ti, Zr, HF, V, Ni, Ta, Cr, Mo, and W; and having a valence $z$ greater than 3 in the compound $MO_aX_b$; O is oxygen and X is a halogen; $b$ is an integer having a value of from 2 to Z; and $a$ is an integer equal to $$\frac{z-b}{2}$$

and has a value of 0 or greater. Thus the term "transition metal halide" as used herein includes metal halides and metal oxyhalides. Particularly desirable metal compounds in this invention are titanium tetrachloride, vanadium oxychloride and chromium oxychloride.

The above transition metal halides are reacted with an organo-aluminum compound having the general formula $$AlR_mY_{3-m}$$

wherein R is a hydrocarbon free of aliphatic unsaturation such as alkyl e.g. ethyl, propyl, and butyl, or aryl e.g. phenyl; $m$ is a number greater than zero and not more than 3; and Y is a halogen group.

The proportions of the compound $MO_aX_b$ and $AlR_mY_{3-m}$ are not narrowly critical. As a minimum there should be used a sufficient amount of the aluminum compound to reduce the valence of a portion of the transition metal, M, to less than 3. It will be noted from the above-given description of the compound $MO_aX_b$ the valence of M, termed there "z" was "greater than 3" in the compound $MO_aX_b$. Valence of M in any specific compound will of course be an integer but it is contemplated in this invention that mixtures of more than one metal halide or mixtures of metal halides wherein the metal exists in different valence states in the two compounds can be used provided the average valence for the transition metal is greater than 3. Where there is but one metal halide present to react with the organo-aluminum compound the term $z$ will equal 4 or more. Average valence of the transition metal in a particular reaction system can be calculated from the data provided by an analysis of the reaction system according to the method of E. G. Tabakova and Z. V. Soloveva, Zavodskaya Lab. 22, No. 12, 1417 (1956).

The quantity of aluminum compound necessary to reduce the valence state of transition metal to less than 3 is in the first instance dependent on the number of transition metal reactive groups i.e. hydrocarbon groups bound to the aluminum. For that reason it is usual to consider the "hydrocarbon equivalents" of the aluminum compound rather than moles of aluminum compound in calculating proportions of catalyst reactants. It is easily seen that triethyl aluminum has 3 hydrocarbon equivalents, diethyl aluminum monochloride 2 hydrocarbon equivalents and so forth.

In carrying out the method of this invention, it is essential to reduce the valence of the metal M to less than 3. The reaction of the hydrocarbon aluminum compound with the transition metal halide proceeds by first reducing the valence of the transition metal from its valence in the compound $MO_aX_b$ ($z$ in the formula above) to 3. When the valence is at 3 the transition metal halide precipitates and the reaction mixture becomes two phase. For the initial reaction to a valence of 3, there is used one hydrocarbon equivalent for each valence above 3. Thus, for example, to reduce $TiCl_4$ to $TiCl_3$ one hydrocarbon equivalent is added, reducing the valence of Ti from 4 to 3. Because the 3 valence state metal compounds are solids and only a small percentage of the surface of the constituent particles is metal atoms and these metal atoms are only a portion of the amount of M in the complex, only enough hydrocarbon to react with and reduce these atoms to a valence less than 3 is needed. Thus as little as 1 percent excess of hydrocarbon equivalent over the amount used to reduce the valence of M to 3 may be sufficient to reduce all surface M atoms, i.e. all available M atoms, to a valence less than 3. Therefore, to reduce a metal M having a valence of 4 to less than 3, as little as 1.01 hydrocarbon equivalents is sufficient. Similarly where M has a valence of 5, e.g. V in VOCl₃, 2.01 hydrocarbon equivalents is sufficient. And where M has a valence of 6, e.g. Cr in CrO₂Cl₂, 3.01 hydrocarbon equivalents is sufficient. It is preferred to add a 50 percent or greater excess, i.e. another one-half of a hydrocarbon equivalent to the amount necessary to reduce the valence of M to 3. Thus it is preferred to employ at least 1.5 hydrocarbon equivalents to reduce tetravalent metals, at least 2.5 hydrocarbon equivalents to reduce pentavalent metals and at least 3.5 hydrocarbon equivalents to reduce hexavalent metals.

Another factor to be considered in choosing proportions of aluminum compound to metal halide is the comparative activity of the aluminum compound. For example the aluminum trialkyls are more vigorous alkylating agents than the corresponding dialkyl aluminum monohalides, which in turn are more vigorous than the corresponding monoalkyl aluminum dihalides.

Use of excessive amounts of aluminum compound results in overreduction of the transition metal, perhaps to the metal itself. In general, a maximum of 30 equivalents of hydrocarbon per equivalent (i.e. mole) of metal halide should be observed. Very careful reaction and closely controlled low temperatures are necessary to avoid overreduction when using greater than 30 equivalents of hydrocarbon per equivalent of metal. Where reaction temperature is above about 100° C. it is desirable to lower the number of hydrocarbon equivalents below 30 progressively as temperatures used rise above 100° C.

The catalyst components can be added to the reaction zone in any order. In continuous reaction systems two independent streams one of each of the two components can be advantageously fed into one end of the agitating-reacting zone. Rate of addition and contact times are not critical with contact times ranging from, for example, 30 seconds to 2 hours having been successfully used. Portions of one or the other of the catalyst components can be added to the whole of the other catalyst component.

Particularly when accomplishing high temperature reduction in preparing the catalyst it is preferred to add only a little of the aluminum compound and to add the remainder at a lower temperature.

The temperature at which the catalyst is prepared is not critical in the method of this invention. Generally speaking the reaction can be effected at temperatures ranging from 0° C. to 200° C., and particularly 25 to 175° C. but temperatures higher or lower can be employed with success.

The use of pressure is not required, except to keep liquid a volatile reaction solvent at elevated reaction temperatures, and will not ordinarily be used, since numerous organic solvents which are liquid at elevated temperatures are readily available.

In the practice of a preferred embodiment of the present invention a solution of a lower alkyl aluminum compound e.g. tri-n-propyl or triisobutyl aluminum in n-heptane or n-decane is added dropwise over the course of about an hour to an agitated solution of either titanium tetrachloride or vanadium oxychloride in the same solvent until there is a molar ratio of aluminum trialkyl to transition metal halide of from 0.5:1 to 1.0:1.0. Bulk temperature is permitted to rise uncontrolled during this first addition step. Concentration of the components in their respective solutions and the reaction mixture are in no way critical. Convenience in handling is the determining factor.

The solution is then further agitated in a suitable apparatus, that is, an apparatus demonstrated to be capable of imparting sufficient motion to the reaction solution that the resulting fluid turbulent shear produces heat at a preferred rate of at least 100 calories per minute per liter of solvent. Preferred devices include a Duplex Dispersator especially in a baffled vessel, a Tri Homo Disc Mill and a Colloid Mill. Agitation with high shear is continued for about an hour. Additional aluminum alkyl is then added. The reaction solution is cooled to below 60° C. if necessary, prior to the further addition of aluminum trialkyl to avoid excessive reduction of the transition metal halide. The second addition of aluminum trialkyl brings the total molar ratio of aluminum trialkyl to transition metal halide to 1.0:1.0 to 11.0:1.0. The catalyst suspension thereby produced is removed under an inert atmosphere.

Catalyst prepared in accordance with the method of this invention are superior catalysts for the polymerization of olefinically unsaturated hydrocarbons heretofore polymerized with Ziegler catalysts especially those which have the general formula

$$R—CH=CH_2$$

wherein R is hydrogen, a saturated aliphatic, alicyclic or an aromatic radical, alone or in mixture with one another.

The practice of the present invention is illustrated by the following examples which are not intended to be nor should they be construed as limitative of the invention. All parts and percentages are by weight unless otherwise stated.

The apparatus used in the examples were tested for adequate shear capacity by introducing 500 milliliters of heptane thereinto and agitating as if during catalyst preparation. Temperature rise was recorded at various intervals. The apparatus used in Example 1 had a calorie output rate of 100 calories per minute per liter.

*Example 1*

ASTM grade n-heptane was dried with nitrogen until the effluent nitrogen contained less than 32 parts per million of water. To a 632.3 gram portion of the n-heptane there was added 9 milliliters of a 0.1 M solution of triisobutyl aluminum in n-heptane and 35.30 grams of C.P. grade titanium tetrachloride and the solution blown under dry nitrogen into a dried 2-liter baffled resin kettle. The kettle was fitted with a 3″ Duplex Dispersator, a dropping funnel thermometer, nitrogen source, and reflux condenser. The dispersator was driven at 2000 r.p.m. and a solution of 58.98 grams of triisobutyl aluminum in 1596 grams of n-heptane was added dropwise over a period of 142 minutes. The temperature rose from 26° C. to 49° C. during this period. The slurry was agitated an additional 24 minutes at 49–50° C. The resulting dark brown suspension was removed in vacuo in an atmosphere of nitrogen. The suspension weighed 961.9 grams, had a density of 0.739 gram/ml. and a nominal triisobutyl aluminum to titanium tetrachloride ratio of 1.75:1.

*Example 2*

Pure n-decane was washed with sulfuric acid and fractionated and then dried with nitrogen until the effluent nitrogen contained less than 15 parts per million of water. To a 356 gram portion of the n-decane there was added 3.6 grams of 0.1 M solution of triisobutyl aluminum in n-decane and 38.14 grams (200 millimoles) of C.P. grade titanium tetrachloride. The solution was transferred under dry nitrogen pressure to a dried 1-liter baffled resin kettle fitted as the 2-liter kettle in Example 1. The Dispersator was driven at 2000 r.p.m. and a solution of 19.89 grams (100 millimoles) distilled triisobutyl aluminum in 74.5 grams of n-decane was added dropwise over a period of 45 minutes. The temperature rose from 25° C. to 50° C. during this period. The resulting dark brown suspension was agitated an additional 65 minutes at between 50–55° C. and then heated with continuing agitation to atmospheric reflux (170° C.). After 40 minutes at 170° C. the brown suspension had turned completely purple. Agitation was continued at 2000 r.p.m. and then kept at 170° C. for another 30 minutes. The reaction mixture was then allowed to cool to less than 60° C. over the course of 50 minutes. The obtained purple suspension was treated with an additional 19.89 grams of distilled triisobutyl aluminum dissolved in 72.7 grams of n-decane. This addition was accomplished over a period of 19 minutes. During this period the temperature of the catalyst mixture dropped to 51° C. Agitation sufficient to maintain the mixture at 47–50° C. was continued for 70 minutes. The catalyst was removed in vacuo in an atmosphere of dry nitrogen. The product was a catalyst suspension weighing 548 grams, having a density of 0.765 gram/ml. and containing 0.108 gram of $TiCl_4$ and $Al(i-Bu)_3$ reaction product per milliliter.

*Example 3*

A solution of 37.69 grams (197 millimoles) of C.P. grade titanium tetrachloride in 365.2 grams of n-decane which had been purified and dried as in Example 2 was heated to reflux in a 1-liter baffled flask equipped as in the previous examples. The Dispersator was driven at 2000 r.p.m. and, as soon as the solution began refluxing dropwise addition of a solution of 24.94 grams (149 millimoles) of tri-n-propyl aluminum (93.6% pure) in 72.1 grams of dry n-decane was begun. The addition took 45 minutes. The temperature of the reaction solution rose to 172° C. The resulting purple-grey suspension was permitted to cool slowly to 42° C. with agitation at 2000 r.p.m. continuing. Thereupon 47.74 grams (285 millimoles) of the tri-n-propyl aluminum dissolved in 72.7 grams of dry n-decane was added over the course of 23 minutes while the reaction mixture temperature was between 41 and 42° C. Agitation was continued for another 20 minutes and the resulting catalyst slurry removed in vacuo under nitrogen. There was obtained 594.4 grams of catalyst slurry having a density of 0.760 gram/ml. and containing a total of 0.141 gram of $TiCl_4$ and $Al(i-Pr)_3$ reaction product per milliliter.

*Example 4*

ASTM grade n-heptane was dried with nitrogen until the effluent nitrogen contained less than 30 parts per million of water. To a 450 milliliter portion of this n-heptane there was added 4.5 milliliters of 0.1 M triisobutyl aluminum in n-heptane and, after 15 minutes, 7.6 grams (0.0438 mole) technical grade vanadium oxychloride. The solution was pressure transferred to a 1-liter kettle equipped as in the previous examples, except that a 1½ inch Duplex Dispersator was used in place of the 3 inch device used in the previous examples. Agitation was provided by rotating the Dispersator at 2000 r.p.m. A solution of 17.7 grams (0.0894 mole) of distilled triisobutyl aluminum in 100 milliliters of dry n-heptane was added dropwise in two equal portions. The first portion of the triisobutyl aluminum was added over a period of 18 minutes. Temperature of the reaction mass increased from 26° C. to 36° C. The solution was agitated for an additional hour at 36° C. and then the second portion of the triisobutyl aluminum was added also over a period of 18 minutes and at 27–29° C. The resultant dull violet suspension was agitated for a half hour and then removed to glass bottles in vacuo and under nitrogen. The yield of catalyst suspension was 399.5 grams. The density was 0.779 gram/ml., corresponding to a 0.26 millimole/ml. total catalyst component concentration at a nominal $Al(i-Bu)_3$—$VOCl_3$ ratio of 2.0:1.

*Example 5* n-Heptane was dried as in Example 4 to a nitrogen effluent water content of less than 40 parts per million. To 450 milliliters of this n-heptane there was added 5 milliliters of 0.1 M triisobutyl aluminum and 7.4 grams (0.0426 mole) technical grade vanadium oxychloride. The solution was transferred with nitrogen pressure to a 1-liter baffled flask equipped as in the previous examples, and with the 3 inch Duplex Dispersator. Agitation was at 2000 r.p.m. Distilled triisobutyl aluminum, 25.8 grams (0.130 mole) in 100 milliliters of dry n-heptane was added dropwise over a period of 65 minutes at temperatures of from 29 to 39° C. A dull violet suspension was obtained and this was removed in vacuo under nitrogen and stored protected in a glass vessel. The suspension weighed 396.5 grams and had a density of 0.697 gram/milliliter which corresponds to 0.303 millimole total catalyst per milliliter at a nominal ratio of $Al(i-Bu)_3$:$VOCl$ of 3:1.

*Example 6*

A one-gallon stainless steel autoclave equipped with an anchor type agitator and the conventional auxiliary openings and instrumentation was charged with 2 liters of dry pure xylene and purged with dry nitrogen until the effluent nitrogen stream contained less than 15 p.p.m. of water. To this was added 12.5 milliliters of the catalyst suspension prepared in Example 3, which contained 1.76 grams of catalyst components ($TiCl_4$+$AlPr_3$). The autoclave was heated to 125° C. within 40 minutes under a blanket of nitrogen, purged free of nitrogen, and pressured with propylene to a partial pressure of 100 p.s.i. A drop in monomer pressure indicated that polymerization commenced immediately. Propylene was fed on demand at 125° C. and 100 p.s.i. partial pressure for six hours. The monomer feed was then stopped and the autoclave permitted to cool. The autoclave contents were quenched with five gallons of isopropanol by expelling the autoclave contents under nitrogen pressure into the isopropanol. The polypropylene polymer was shredded by vigorous agitation and filtered. The resultant white polymer, after drying to constant weight, weighed 443 grams, equivalent to a catalyst productivity of 250 grams of polymer per gram of total catalyst components. The polymer was highly crystalline, melted at 167–168° C. and was 88% insoluble in boiling diethyl ether.

*Example 7*

To a three-liter glass resin kettle equipped with an agitator, a thermometer, condenser, nitrogen source and inlet for gaseous monomer, was added 1,200 milliliters ASTM grade n-heptane. The n-heptane was dried by purging with dry nitrogen until the effluent moisture level fell below 50 p.p.m. To this was added 6 ml. containing a total of 1.73 grams of catalyst components of a brown catalyst slurry prepared in a manner of Example 1, but at a mole ratio of $Al(i-Bu)_3$/$TiCl_4$ of 1.5:1. A mixture of dry ethylene and propylene, containing 10% propylene by weight, was passed through the n-heptane at 2.5 liter per minute at atmospheric pressures. The exothermic heat of reaction raised the reaction temperature from 25 to 69° C. and maintained it at 69° C. for six hours. After this time, the reaction mass was too viscous to stir, and the monomer feed was shut off. The reaction mass was quenched with one liter of methanol and filtered. After drying there was obtained 186 grams of a white, ethylene-propylene copolymer equivalent to a catalyst productivity of 108 grams of copolymer per gram of catalyst.

*Example 8*

To a three-necked flask equipped with a dropping funnel, condenser, stirrer, thermometer and source of dry nitrogen was added 100 milliliters of pure dry toluene and 100 milliliters pure dry styrene. To this mixture was added 3.8 milliliters of catalyst suspension prepared according to Example 2 plus an additional 0.198 gram distilled $Al(i-Bu)_3$ resulting in a total of 0.58 gram of catalyst components. The polymerization was permitted to continue for one hour at 75–77° C. Then the reaction was quenched with isopropanol and the polymer filtered. The resultant polymer was washed with methanol and dried in vacuo at 65–70° C. to constant weight.

There was obtained per gram total catalyst 60.4 grams crystalline polystyrene which was 93.3% insoluble in boiling methyl ethyl ketone.

Example 9

A No. 4 Tri Homo rotating cone mill with a No. 1 rotor cone and a No. 1 stator cone was utilized at a clearance of 0.0005. Triisobutylaluminum (10% by weight solution in dry iso-octane) and titanium tetrachloride (10% by weight solution in dry iso-octane) were fed from agitated, stainless steel tanks through stainless steel pumps to the mill suction and from the mill discharge to an agitated stainless steel receiver. The rate of flow of the respective solutions was controlled to provide an overall ratio of 0.75:1 mole Al(i-Bu)$_3$:TiCl$_4$. It was necessary to cool the mill to maintain the bulk temperature of the system below 50° C. A typical analysis for a catalyst slurry made in this manner indicates no tetravalent titanium, 92% trivalent titanium, and 8% divalent titanium; according to the mehod of E.G. Tabakova and Z. V. Soloveva, Zavodskaya Lab., 22, No. 12, 1417 (1956). This catalyst slurry was then stored protected from atmospheric contamination.

Ethylene polymerization was carried out with this catalyst using a baffled autoclave equipped with an agitator and the necessary piping to feed continuously ethylene, hydrogen, catalyst slurry and heptane, and also to remove polymer solution continuously. Provision was made for occasional venting or sampling of the vapor space above the polymerization. At a temperature of 130° C. and a pressure of 130–145 p.s.i. gauge, there was fed to the autoclave the heptane slurry of the above catalyst at a rate of 2–4 lbs./hr. together with an additional amount of triisobutylaluminum in heptane, again at 2–4 lbs./hr. in amount sufficient to bring the overall molar ratio of Al/Ti to 1.5:1 in the polymerization vessel. Ethylene gas and hydrogen were added to a total pressure of 130–145 p.s.i. Heptane was added at 90–120 lbs./hr. with a total concentration of catalyst of 1.9 millimoles per liter, a contact time in the autoclave of 2–3 hours, and with 7–9% hydrogen in the vapor space, there was produced during the 12-hour run, a polyethylene of 0.9618 density, at an overall productivity of 175 lbs. of polymer per pound of total catalyst.

Examples 10–21

A series of polymerizations of various monomers and mixtures of monomers were carried out in the equipment and in the manner of Examples 1–5 using catalysts prepared as in Example 9 using various alkyl aluminum compounds, different ratios of catalyst compounds and different temperatures for catalyst preparation. To demonstrate the resistance of these catalyst slurries to aging deterioration the various catalysts were aged under nitrogen at about 25° C. for periods ranging from 1 to 167 days.

Example 22

A solution of 47.52 grams (250 millimoles) of TiCl$_4$ in 271.70 grams n-decane purified as described in Example 2, was transferred under dry nitrogen pressure to a dried, 1-liter baffled resin kettle fitted as the 2-liter kettle in Example 1. The 3" Duplex Dispersator was driven at 2000 r.p.m. and a solution of 18.03 grams diethylaluminum chloride (149.8 millimoles) dissolved in 68.95 grams pure, dry n-decane added dropwise within 25 minutes at 25–33° C. The resulting dark brown suspension was agitated an additional 35 minutes, with no external heat, the temperature of the agitated slurry rising to 50° C. The reaction mixture was heated to reflux at 162° C. within 35 minutes, 15 minutes later at 171.5° C., the suspension was completely purple. The suspension was heated under reflux 35 minutes longer, and cooled within 80 minutes at 47° C. At this point 89.31 grams diethyl aluminum chloride (=740 millimoles) dissolved in 71.77 grams of pure dry n-decane was added within 15 minutes at 47–48° C. Agitation was continued two hours longer, without any external heat, at 51–55° C. The reaction temperature was kept above the ambient temperature of 23° C. by the energy imparted to the suspension by high shear agitation. The catalyst slurry was then removed in vacuo under nitrogen. The final slurry weighed 668.47 grams, density 0.79 g./ml., corresponding to 0.295 milliequivalent of Ti/ml., at an overall molar ratio of diethyl aluminum chloride to titanium tetrachloride of 3.56:1.

Example 23

Reagent-grade xylene (B.P.R. 137–140° C.) is dried with nitrogen until the effluent nitrogen contains less than 20 p.p.m. water. To a 657.3 gram portion of this dry xylene there is added 18.93 grams C.P. grade TiCl$_4$ and the solution blown under nitrogen to a dried, 5-liter baffled resin kettle fitted as the 2-liter kettle in Example 1. The 3" Duplex Dispersator is driven at 2,000 r.p.m., and a solution of 27.31 grams recrystallized triphenyl aluminum in 2,142 grams dry, hot xylene is added dropwise within 83 minutes. The temperature rise is from 23 to 56° C. The resulting brown suspension is agitated an additional 126 minutes at between 50–55° C. The brown suspension is removed in vacuo in an atmosphere of nitrogen. It weighs about 2,687 grams, has a density of 0.711 g./ml., and a nominal triphenyl aluminum to titanium tetrachloride ratio of 1.05:1.

What is claimed is:

1. Method for polymerizing olefinically unsaturated hydrocarbon monomers having the formula R—CH=CH$_2$ wherein R is a member selected from the class consisting of hydrogen, saturated aliphatic, alicyclic and aromatic hydrocarbon groups which comprises contacting said monomer with a highly geometrically uniform essentially

TABLE II

| Example No. | Organo-Aluminum Compound | Transition Metal Compound | Moles Al/moles Ti | Highest Catalyst Preparation Temperature | Catalyst Age, Days at 25° C. Under N$_2$ | Polymer and Yield (gram/gram catalyst) |
|---|---|---|---|---|---|---|
| 10 | Al(i-Bu)$_3$ | TiCl$_4$ | 1.5 | 45 | 38 | 145 ethylene/propylene copolymer. |
| 11 | Al(i-Bu)$_3$ | TiCl$_4$ | 2.25 | 170 | 20 | 307 polypropylene. |
| 12 | Al(i-Bu)$_3$ | TiCl$_4$ | 1.0 | 170 | 2 | 527 polypropylene. |
| 13 | Al(Pr)$_3$ | TiCl$_4$ | 1.5 | 170 | 1 | 263 polypropylene. |
| 14 | Al(Et)$_3$ | TiCl$_4$ | 2 | 45 | 20 | 113 ethylene/propylene copolymer. |
| 15 | Al(i-Bu)$_3$ | TiCl$_4$ | 1.5 | 44 | 14 | 108 ethylene/propylene copolymer. |
| 16 | Al(i-Bu)$_3$ | TiCl$_4$ | 2.25 | 170 | 28 | 492 polypropylene. |
| 17 | Al(Pr)$_3$ | TiCl$_4$ | 2.25 | 170 | 120 | 178 polypropylene. |
| 18 | Al(Pr)$_3$ | TiCl$_4$ | 1.5 | 170 | 167 | 42 polypropylene. |
| 19 | Al(i-Bu)$_3$ | TiCl$_4$ | 1.5 | 170 | 8 | 60 polystyrene.* |
| 20 | Al(i-Bu)$_3$ | TiCl$_4$ | 2 | 47 | 15 | 12 polyethylene. |
| 21 | Al(i-Bu)$_3$ | TiCl$_4$ | 1.5 | 50 | 19 | 175 polyethylene. |

*Gram polymer/gram catalyst/hour.

The symbols Al(iBu)$_3$, Al(Pr)$_3$, and Al(Et)$_3$, in Table II and throughout the specification mean triisobutyl aluminum, tri-n-propyl aluminum and triethyl aluminum respectively.

spheroidal particulate organo-metallic catalyst having an average particle size between 200 and 300 Angstroms in diameter and wherein no appreciable number of particles exceeds 500 Angstroms, said catalyst having been produced from (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $$\frac{z-b}{2}$$

and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, by contacting said metal halide reactant with a sufficient amount of said organo-aluminum compound reactant to reduce the valence of a portion of M to less than 3 while each reactant is dissolved in a reaction medium comprising an inert organic solvent therefor which is not a solvent for their reaction product, and throughout the contacting step subjecting the reactants to continual high speed agitation in a pattern characterized by internal fluid shear which is sufficient to produce at least 10 calories per minute per liter of solvent and precipitating the reaction product from the reaction medium.

2. Method for polymerizing olefinically unsaturated hydrocarbon monomers having the formula R—CH=CH$_2$ wherein R is a member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $$\frac{z-b}{2}$$

and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, by contacting said metal halide reactant with a sufficient amount of said organo-aluminum compound reactant to reduce the valence of a portion of M to less than 3 while both reactants are fluid, and throughout the contacting step subjecting the reactants to continual high speed agitation in a pattern characterized by internal fluid shear which is sufficient to produce at least 10 calories per minute per liter of agitated fluid.

3. Method for polymerizing olefinically unsaturated hydrocarbon monomers having the formula R—CH=CH$_2$ wherein R is a member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $$\frac{z-b}{2}$$

and has a value of at least zero, and (B) an organo-aluminum compound having the formula $$AlR_mY_{3-m}$$

wherein R is a hydrocarbon group free of aliphatic unsaturation, $m$ is a number greater than zero and not more than 3, and Y is a halogen, by contacting said metal halide reactant with a sufficient amount of said organo-aluminum compound reactant to reduce the valence of a portion of M to less than 3 while both reactants are fluid, and throughout the contacting step subjecting the reactants to continual high speed agitation in a pattern characterized by internal fluid shear which is sufficient to produce at least 100 calories per minute per liter of agitated fluid.

4. Method for polymerizing olefinically unsaturated hydrocarbon monomers having the formula R—CH=CH$_2$ wherein R is a member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from a titanium tetrahalide and an aluminum trialkyl, by contacting together said titanium tetrahalide with a sufficient amount of said aluminum trialkyl to reduce the valence of a portion of the titanium to less than 3 while each reactant is dissolved in a reaction medium comprising an inert organic solvent therefor which is not a solvent for their reaction product, and throughout the contacting step subjecting the reactants to continual high speed agitation in a pattern characterized by internal fluid shear which is sufficient to produce at least 10 calories per minute per liter of solvent and precipitating the reaction product from the reaction medium.

5. Method for polymerizing olefinically unsaturated hydrocarbon monomers having the formula R—CH=CH$_2$ wherein R is a member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $$\frac{z-b}{2}$$

and has a value of at least zero, and
(B) an organo-aluminum compound having the formula $$AlR_mY_{3-m}$$

wherein R is a hydrocarbon group free of aliphatic unsaturation, $m$ is a number greater than zero and not more than 3, and Y is a halogen, by contacting said metal halide reactant with a sufficient amount of said organo-aluminum compound reactant to reduce the valence of a portion of M to less than 3 while each reactant is dissolved in a reaction medium comprising an inert organic solvent therefor which is not a solvent for their reaction product, and throughout the contacting step subjecting the reactants to continual high speed agitation in a pattern characterized by internal fluid shear which is sufficient to produce at least 100 calories per minute per liter of solvent and precipitating the reaction product from the reaction medium.

6. Method for polymerizing olefinically unsaturated hydrocarbon monomers having the formula $R-CH=CH_2$ wherein R is a member selected from the class consisting of hydrogen, saturated aliphatic, alicyclic and aromatic hydrocarbon groups which comprises contacting said monomer with a highly geometrically uniform essentially spheroidal particulate organo-metallic catalyst having an average particle size between 200 and 300 Angstroms in diameter and wherein no appreciable number of particles exceeds 500 Angstroms, said catalyst having been produced from (A) transition metal halides having the formula $$MO_aX_b$$

wherein M is a transition metal selected from the class consisting of metals of groups IV$b$, V$b$ and VI$b$ of the Deming periodic table having a valence $z$ greater than 3 in the compound $MO_aX_b$; O is oxygen and X is a halogen; $b$ is an integer having a value of 2 to $z$ and $a$ is an integer equal to $$\frac{z-b}{2}$$

and has a value of at least zero, and
(B) an organo-aluminum compound having the formula $$AlR_mY_{3-m}$$

wherein R is a hydrocarbon group free of aliphatic unsaturation, $m$ is a number greater than zero and not more than 3, and Y is a halogen, by contacting said metal halide reactant with an amount of said organo-aluminum compound reactant sufficient to provide a number of hydrocarbon equivalents equal at least to the difference between 3 and the valence $z$ of M in the compound $MO_aX_b$ plus an additional one percent thereof by weight and not more than 30 equivalents of hydrocarbon per equivalent of metal halide, while each reactant is dissolved in a reaction medium comprising an inert organic solvent therefor which is not a solvent for their reaction product, and throughout the contacting step subjecting the reactants to continual high speed agitation in a pattern characterized by internal fluid shear which is sufficient to produce at least 10 calories per minute per liter of solvent and precipitating the reaction product from the reaction medium.

7. Method claimed in claim 2 wherein the hydrocarbon monomer is propylene.

8. Method claimed in claim 2 wherein the hydrocarbon monomer is ethylene.

References Cited by the Examiner
UNITED STATES PATENTS

| | | | |
|---|---|---|---|
| 2,491,116 | 12/1949 | Krause | 252—429 |
| 2,647,111 | 7/1953 | Shusman | 260—93.5 |
| 2,659,717 | 11/1953 | Park | 260—93.5 |
| 2,962,451 | 11/1960 | Schreyer | 252—429 |
| 2,976,252 | 3/1961 | Leary | 252—429 |
| 2,991,157 | 7/1961 | Orzechowski | 252—429 |
| 3,041,325 | 6/1962 | Farnham | 252—429 |
| 3,058,970 | 10/1962 | Ruse | 252—429 |

JOSEPH L. SCHOFER, *Primary Examiner.*

F. L. DENSON, *Assistant Examiner.*